(12) United States Patent
Iwahara et al.

(10) Patent No.: US 9,938,997 B2
(45) Date of Patent: Apr. 10, 2018

(54) CLIP ATTACHMENT STRUCTURE

(71) Applicant: DAIWA KASEI KOGYO KABUSHIKI KAISHA, Aichi (JP)

(72) Inventors: Toshio Iwahara, Aichi (JP); Makoto Kato, Aichi (JP); Tetsuya Ogino, Aichi (JP)

(73) Assignee: DAIWA KASEI KOGYO KABUSHIKI KAISHA, Aichi-ken (JP)

( * ) Notice: Subject to any disclaimer, the term of this patent is extended or adjusted under 35 U.S.C. 154(b) by 222 days.

(21) Appl. No.: 14/655,010

(22) PCT Filed: Jan. 15, 2014

(86) PCT No.: PCT/JP2014/050558
§ 371 (c)(1),
(2) Date: Jun. 23, 2015

(87) PCT Pub. No.: WO2014/119366
PCT Pub. Date: Aug. 7, 2014

(65) Prior Publication Data
US 2015/0337882 A1      Nov. 26, 2015

(30) Foreign Application Priority Data
Jan. 31, 2013   (JP) ................. 2013-017196

(51) Int. Cl.
*B60R 13/02*   (2006.01)
*F16B 5/06*    (2006.01)
(Continued)

(52) U.S. Cl.
CPC ............. *F16B 2/20* (2013.01); *F16B 5/0657* (2013.01); *F16B 5/0664* (2013.01); *F16B 21/02* (2013.01);
(Continued)

(58) Field of Classification Search
CPC ...... B60R 13/0206; F16B 2/20; F16B 5/0664; F16B 5/0657; F16B 5/065
See application file for complete search history.

(56) References Cited

U.S. PATENT DOCUMENTS 4,422,222 A * 12/1983 Notoya ................. F16B 5/0642
24/289
4,647,262 A *  3/1987 Yokota .................... F16B 21/02
24/453
(Continued)

FOREIGN PATENT DOCUMENTS

JP    H 5-96524 U    12/1993
JP    H 6-18706 U     3/1994
(Continued)

*Primary Examiner* — Jason W San
(74) *Attorney, Agent, or Firm* — Christensen, Fonder, Dardi & Herbert PLLC

(57) ABSTRACT

A clip attachment structure with a clip and a mounting member attached to a panel by the clip is provided. The clip has an anchor that attaches the mounting member to the panel by insertion into a clip hole in the panel. A pair of elastic claws extends from the anchor. The pair of elastic claws may engage with the clip hole and may disengage from the clip hole upon rotation of the clip relative to the clip hole from an attached position. The mounting member has a pair of ribs configured to guide the clip relative to the mounting member to orient the pair of elastic claws to engage with the edges of the clip hole.

8 Claims, 12 Drawing Sheets

(51) Int. Cl.
*F16B 2/20* (2006.01)
*F16B 21/02* (2006.01)
*F16B 21/07* (2006.01)

(52) U.S. Cl.
CPC ....... *F16B 21/071* (2013.01); *Y10T 24/44291* (2015.01)

(56) References Cited

U.S. PATENT DOCUMENTS

| | | | | |
|---|---|---|---|---|
| 5,051,021 A * | 9/1991 | Pelz | ............................ | B25G 3/06 248/222.12 |
| 5,193,961 A * | 3/1993 | Hoyle | ................... | F16B 21/075 24/297 |
| 5,507,610 A * | 4/1996 | Benedetti | .............. | F16B 5/0628 24/297 |
| 5,718,549 A * | 2/1998 | Noda | .................... | F16B 5/0635 411/349 |
| 5,975,820 A * | 11/1999 | Kirchen | ................ | F16B 5/0628 411/339 |
| 6,196,607 B1 * | 3/2001 | Gulisano | ................. | B60R 13/01 293/115 |
| 6,253,423 B1 * | 7/2001 | Friedrich | ............ | B60R 13/0206 24/289 |
| 6,813,865 B2 * | 11/2004 | Peterson | ............. | B60R 13/0206 296/39.1 |
| 7,036,779 B2 * | 5/2006 | Kawaguchi | ........... | F16B 5/0642 174/135 |
| 7,073,231 B2 * | 7/2006 | Draggoo | ............. | B60R 13/0206 24/297 |
| 7,114,221 B2 * | 10/2006 | Gibbons | ................. | F16B 5/065 24/289 |
| 7,152,281 B2 * | 12/2006 | Scroggie | ............. | B60R 13/0206 24/289 |
| 7,178,855 B2 * | 2/2007 | Catron | ................... | B60J 5/0468 24/297 |
| 7,481,474 B2 * | 1/2009 | Higgins | ................ | F16B 21/086 24/292 |
| 7,698,787 B2 * | 4/2010 | Scroggie | ............... | F16B 21/082 24/297 |
| 7,748,089 B2 * | 7/2010 | Jalbert | .................. | F16B 5/0657 24/297 |
| 7,904,994 B2 * | 3/2011 | Girodo | ............... | B60R 13/0206 24/297 |
| 7,927,050 B2 * | 4/2011 | Koike | .................. | F16B 5/0628 411/104 |
| 7,954,205 B2 * | 6/2011 | Xueyong | .............. | B60R 13/0206 24/289 |
| 8,046,880 B2 * | 11/2011 | Katoh | .................. | F16B 5/0628 24/297 |
| 8,099,839 B2 | 1/2012 | Katoh et al. | | |
| 8,291,553 B2 * | 10/2012 | Moberg | ................. | B60J 5/0468 24/297 |
| 8,322,001 B2 * | 12/2012 | Ehrhardt | ............. | B60R 13/0206 24/289 |
| 8,381,368 B2 * | 2/2013 | Donahue-Yan | ..... | B60R 13/0206 24/289 |
| 8,495,802 B2 * | 7/2013 | Okada | ................. | B60R 13/0206 24/297 |
| 8,511,631 B2 * | 8/2013 | Kato | .................... | B60R 13/0206 24/297 |
| 8,572,818 B2 * | 11/2013 | Hofmann | ............ | B60R 13/0206 24/297 |
| 8,585,121 B2 * | 11/2013 | Marx | .................. | B60R 13/0206 24/289 |
| 8,656,563 B2 * | 2/2014 | Hiramatsu | ............ | F16B 41/002 24/297 |
| 8,979,156 B2 * | 3/2015 | Mally | ................... | F16B 5/0657 24/297 |
| 9,216,703 B2 * | 12/2015 | Lauxen | ............... | B60R 13/0206 |
| 9,499,108 B2 * | 11/2016 | Dickinson | ............... | F16B 5/123 |
| 9,534,620 B2 * | 1/2017 | Courtin | ................. | F16B 5/065 |
| 2004/0016088 A1 * | 1/2004 | Angellotti | ............... | F16B 5/065 24/297 |
| 2007/0107174 A1 * | 5/2007 | Bordas | ................ | B60R 13/0206 24/664 |
| 2008/0201920 A1 * | 8/2008 | Jatzke | ..................... | B60R 11/00 24/458 |
| 2011/0113598 A1 * | 5/2011 | Hofmann | ............ | B60R 13/0206 24/458 |
| 2012/0073089 A1 * | 3/2012 | Buillas | ................ | B60R 13/0206 24/293 |
| 2014/0255089 A1 * | 9/2014 | Courtin | ................. | F16B 5/065 403/326 |
| 2015/0113773 A1 * | 4/2015 | Iwahara | ............. | B60R 13/0206 24/594.11 |
| 2016/0129854 A1 * | 5/2016 | Bachelder | ........... | B60R 13/0206 24/292 |
| 2016/0368433 A1 * | 12/2016 | Vega Velazquez | . | B60R 13/0206 |

FOREIGN PATENT DOCUMENTS

| | | |
|---|---|---|
| JP | 2000-9117 A | 1/2000 |
| JP | 2000-55020 A | 2/2000 |
| JP | 2002-330531 A | 11/2002 |
| JP | 2003-72492 A | 3/2003 |
| JP | 2006-220267 A | 8/2006 |
| JP | 2008-038964 A | 2/2008 |
| JP | 2010-078065 A | 4/2010 |
| JP | 2011-158059 A | 8/2011 |

* cited by examiner

CLIP ATTACHMENT STRUCTURE

CROSS-REFERENCE TO RELATED APPLICATIONS

The present application is a National Phase entry of, and claims priority to, PCT Application No. PCT/JP2014/050558, filed Jan. 15, 2014, which claims priority to Japanese Patent Application No. 2013-017196, filed Jan. 13, 2013, both of which are incorporated herein in their entireties by reference.

TECHNICAL FIELD

The present invention relates to a clip attachment structure. More particularly, the present invention relates to a clip attachment structure with a clip and a mounting member attached to a panel by the clip. The clip has an anchor that attaches the mounting member to the panel by insertion into a clip hole in the panel.

BACKGROUND ART

Conventionally, a clip attachment structure may be configured to attach a mounting member, such as a cover, to a corresponding panel. The panel may include a clip hole with two opposing edges. A clip of the clip attachment structure has an anchor portion and a pair of elastic claws extending from the anchor portion. The anchor portion inserts into the clip hole to engage the elastic claws with both edges of the clip hole.

Japanese Laid-Open Patent Publication No. 2008-38964 generally discloses a clip with elastic claws extending from the clip, a panel with a corresponding clip hole having an elongated shape, and a mounting member. To attach the mounting member to the panel, the clip may be inserted into the clip hole in the panel where the elastic claws of the clip may engage with the longitudinal edges of the clip hole to hold the clip in place as desired. Further, the clip may be detached from the clip hole upon rotation of about 90 degrees relative to the clip hole. Thus, the clip can be removed from the panel. In detail, there is no need to draw the elastic claws out of the clip hole using excessive force when removing the clip from the panel. Thus, even if the pair of elastic claws is firmly engaged with the panel, the requisite force for removing the clip is small.

When inserting the anchor portion into the clip hole, the pair of elastic claws is moved toward the longitudinal edges of the clip hole. Should the pair of elastic claws be erroneously moved toward the short edges of the clip hole, the elastic claws may not properly engage with the edges of the clip hole. Thus, it is necessary to attach the clip to the mounting member while paying attention to the angle of the clip with respect to the mounting member.

Thus, there has been a need in the art for a clip that can be both easily removed from the panel and can be easily correctly attached to a mounting member as needed.

SUMMARY OF THE INVENTION

The present invention generally relates to a clip attachment structure. In addition, the present invention relates to a clip attachment structure with a clip and a mounting member attached to a panel by the clip. In detail, the clip has an anchor configured to attach the mounting member to the panel by insertion into a clip hole in the panel. Further, a pair of elastic claws extends from the anchor to engage with the clip hole. The clip is configured to disengage from the clip hole upon rotation of the clip relative to the clip hole from an attached position where the pair of elastic claws is engaged with the edges of the clip hole. The mounting member has a pair of ribs configured to guide the clip relative to the mounting member to orient the pair of elastic claws to engage with the edges of the clip hole. The pair of ribs may regulate an attachment direction of the clip relative to the mounting member such that the pair of elastic claws of the clip are oriented to engage with the longitudinal edges of the clip hole.

In further detail, the pair of elastic claws may be released from the longitudinal edges of the clip hole upon rotation of the clip by approximately 90 degrees relative to the clip hole. Thus, as described in the related-art techniques, the requisite force needed to remove the clip from the panel may be minimized. Further, the ribs of the mounting member may block an/or otherwise interfere with the clip should the clip be inserted into the mounting member in an incorrect direction. Accordingly, erroneous attachment of the clip to the mounting member may be prevented.

According to another aspect of the invention, the anchor portion may have a detachment prevention member to prevent detachment of the clip from the mounting member by contacting, blocking and/or otherwise interfering with the ribs of the mounting member. Thus, should the clip receive an external force to detach from the mounting member, the detachment prevention member may interfere with the ribs to hold the clip in place. As a result, unwanted detachment of the clip from the mounting member may be prevented.

According to yet another aspect of the invention, the anchor portion may have a protrusion that enters a first recess of the mounting member. The anchor may be configured to minimize and/or prevent unwanted movement and/or idling of the clip. Also detachment of the clip from the mounting member due to, for example, the vibration during transportation may be prevented.

According to still another aspect of the invention, the mounting member may have a second recess. In detail, the clip may be rotated approximately 90 degrees with respect to the clip hole to detach the protrusion from the first recess and maneuver the protrusion around and/or over a surface of the mounting member to enter the protrusion in the second recess. Thus, when the clip rotates approximately 90 degrees relative to the clip hole to remove the mounting member from the panel, the protrusion of the clip may move from the first recess to the second recess. Further, due to the orientation and/or construction of the clip relative to the mounting member, a worker rotating the clip may notice that the clip crisply detaches from the first recess to engage with the second recess as described above.

DETAILED DESCRIPTION OF THE INVENTION

Figure 1:
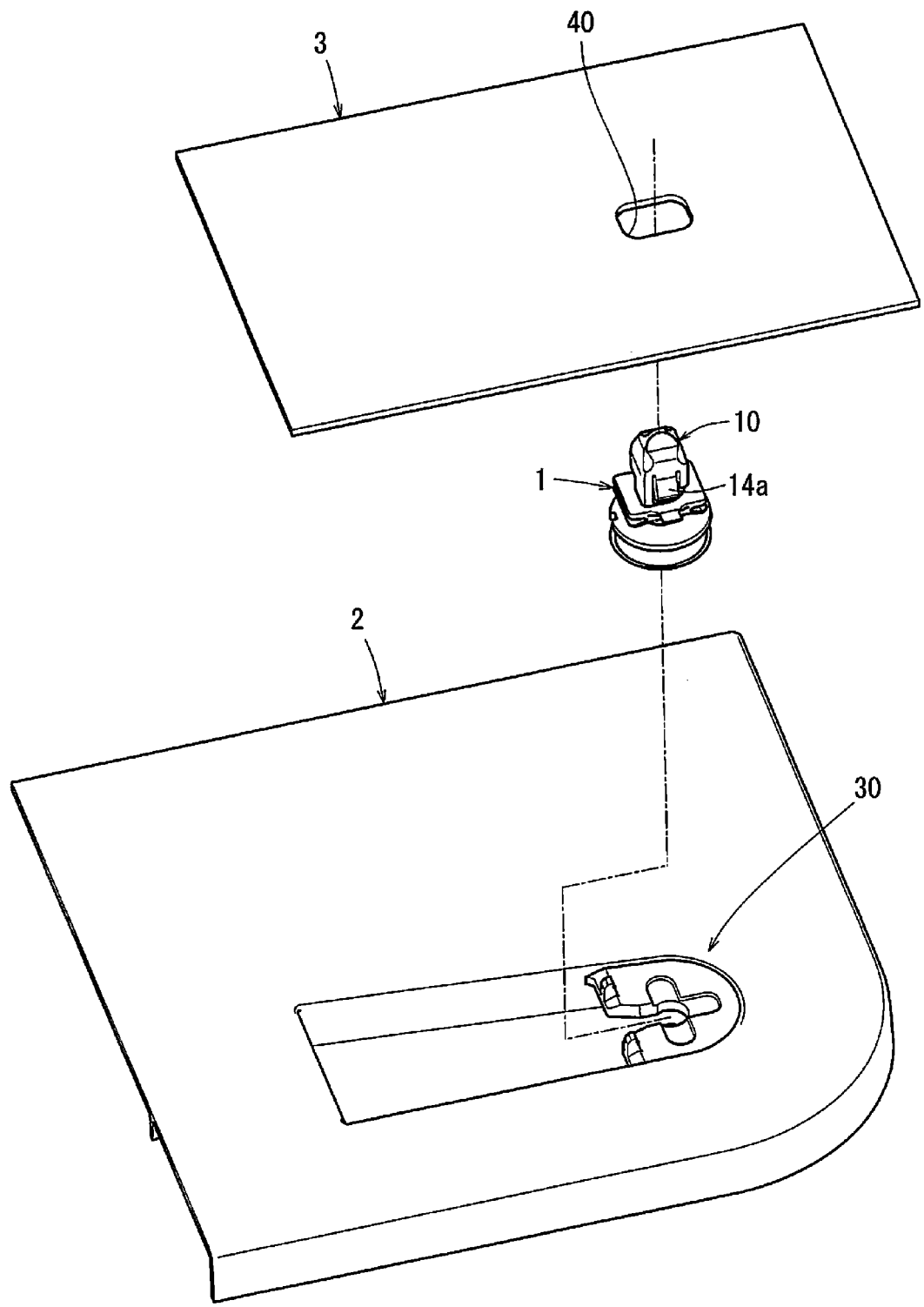
FIG. 1 is a perspective view of an inner panel and a cover before a clip is attached to them.

An embodiment of the present invention will be described with reference to FIGS. 1 to 20. As shown in FIG. 1, a clip attachment structure has a clip 1, a mounting member, and a panel. The mounting member may be, for example, a cover 2 that is an interior component of a vehicle door. The panel may be, for example, an inner panel 3 of a vehicle door. The cover 2 may be mounted to the inner panel 3 by the clip 1.

Figure 2:
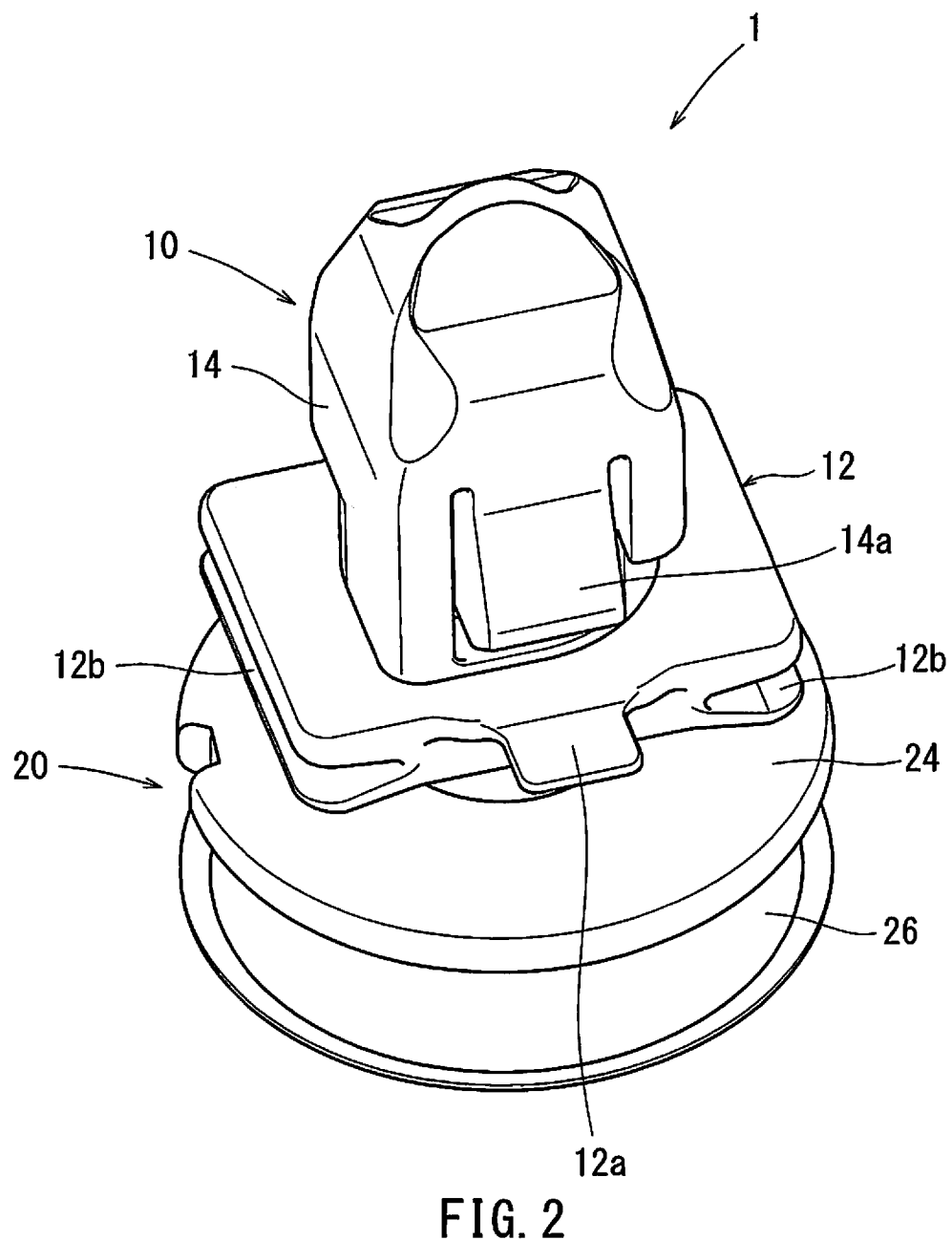
FIG. 2 is a perspective view of the clip from above.
Figure 3:
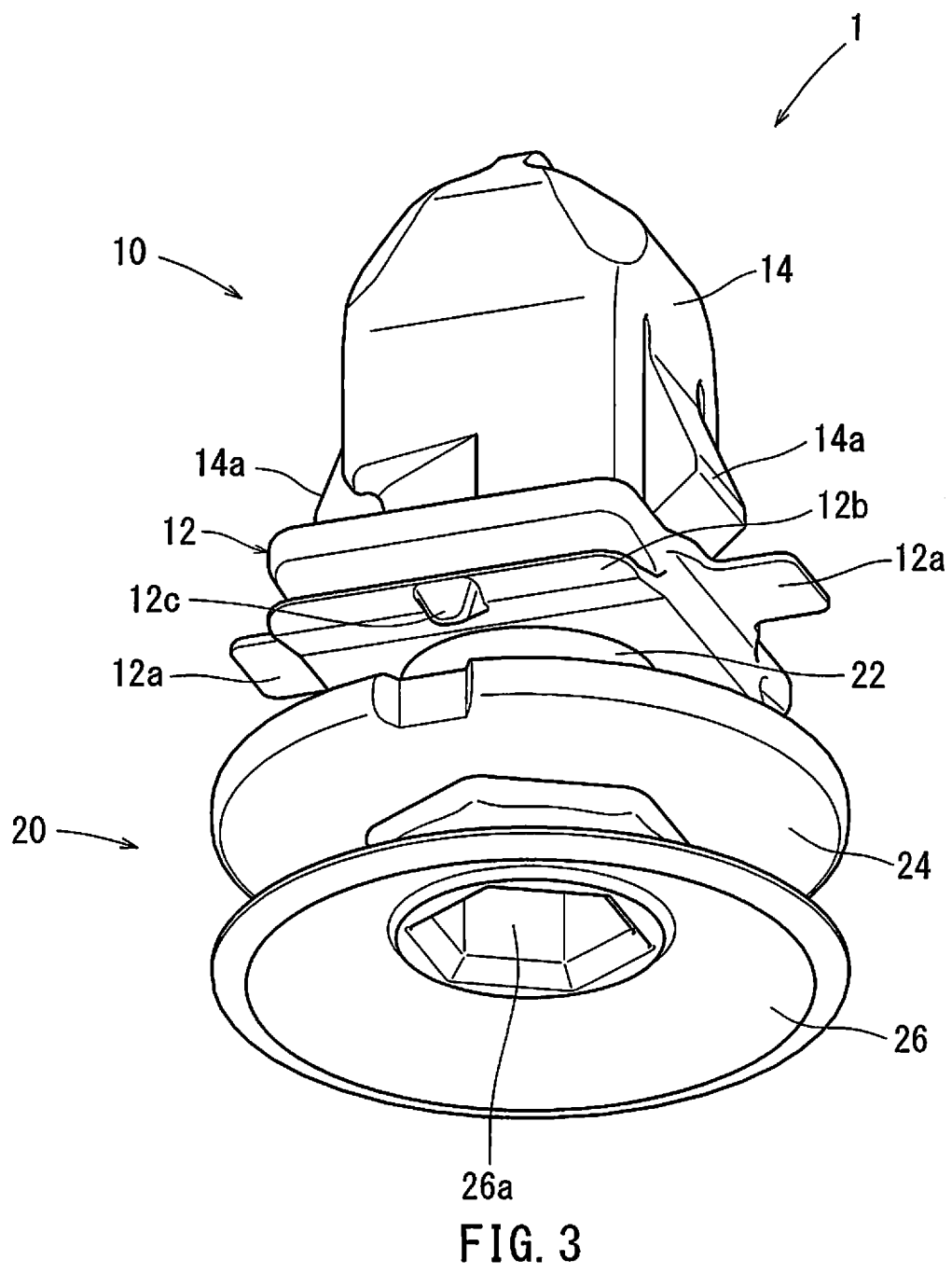
FIG. 3 is a perspective view of the clip from underneath.

As shown in FIGS. 2 and 3, the clip 1 has an anchor portion 10 and an attachment section 20. The anchor portion 10 is mounted to the inner panel 3. The attachment section 20 is attached to the cover 2. The anchor portion 10 has a base plate 12 and a pair of elastic claws 14a. The base plate 12 may have a generally rectangular configuration. A pillar 14 extends from the center of the base plate 12, and the elastic claws 14a extend laterally from the pillar 14. A pair of detachment prevention members 12a extend from the longitudinal edges of the base plate 12. The detachment prevention members 12a extend from approximately the center of the longitudinal edges so as to be substantially parallel to the upper surface of the base plate 12.

As shown in FIGS. 2 and 3, the base plate 12 includes a pair of compressible and/or elastic members 12b. The elastic members 12b extend obliquely away from the base plate 12 in a direction opposite the direction in which the pillar 14 extends. The elastic members 12b are provided in the vicinity of the short edges of the base plate 12. The short edges are shorter in length than the longitudinal edges, and extend in a direction orthogonal to the longitudinal direction. Also, each elastic member 12b has an opposite surface on the opposite side of the base plate 12. A protrusion 12c is located on each opposite surface. The protrusions 12c may elastically reposition in correspondence with elastic deformation of the elastic members 12b (elastic protrusions).

As shown in FIGS. 2 and 3, the attachment section 20 has a pillar 22, a flange 24, and a stabilizer 26. The pillar 22 may be generally configured as a column. The pillar 22 extends from the base plate 12 in a direction opposite the direction in which the pillar 14 extends. The flange 24 protrudes from the outer peripheral surface of the pillar 22. The stabilizer 26 is formed at the distal end of the pillar 22.

Figure 10:
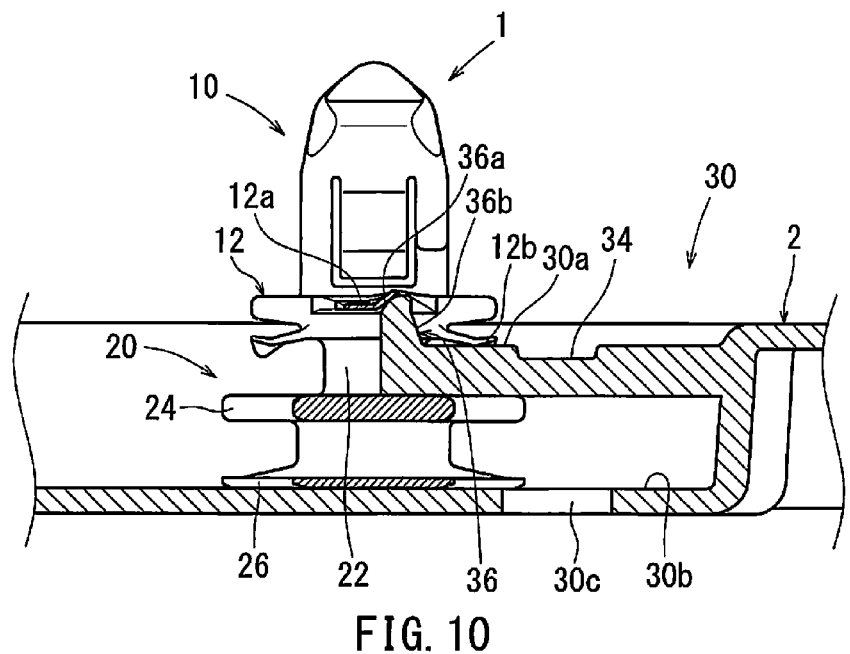
FIG. 10 is a cross-sectional view taken along line X-X in FIG. 9.
Figure 12:
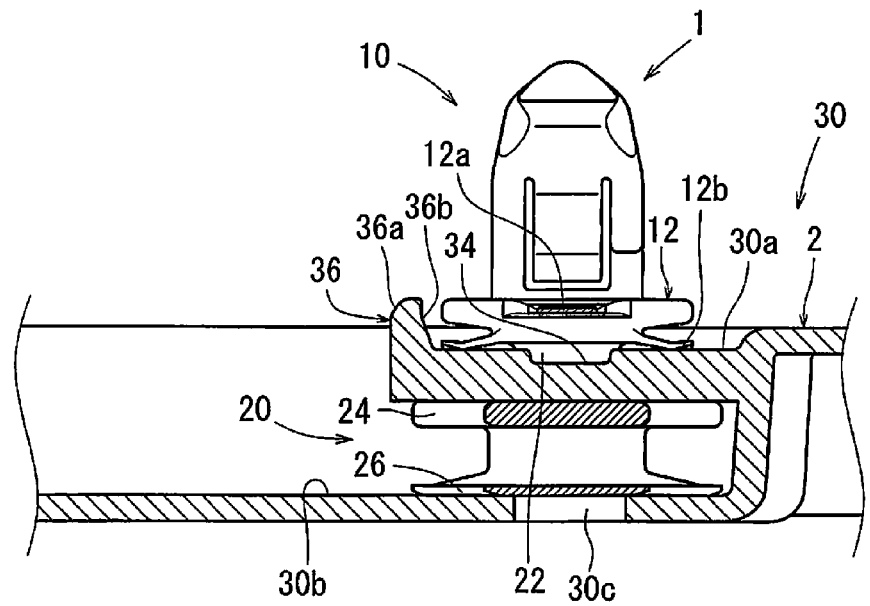
FIG. 12 is a cross-sectional view taken along line XII-XII in FIG. 11.

Referring generally now to FIGS. 10 and 12, the flange 24 and the elastic members 12b may pinch and/or squeeze a mounting area 30. The reaction force associated with recovering from compression and/or deflection of the elastic members 12b may be applied to a surface 30a of the mounting area 30. Such a restorative force may suppress detachment of the attachment section 20 from the mounting area 30.

When the attachment section 20 is attached to the mounting area 30 of the cover 2, a restorative force associated with recovering from the deflection of the stabilizer 26 may act on a bottom surface 30b of the mounting area 30. Thus, rattling caused by unwanted movement of the attachment section 20 with respect to the cover 2 may be suppressed. Further, a tool insertion hole 26a allowing insertion of a tool (not shown) to rotate the clip 1 is located in the lower surface of the stabilizer 26.

Figure 4:
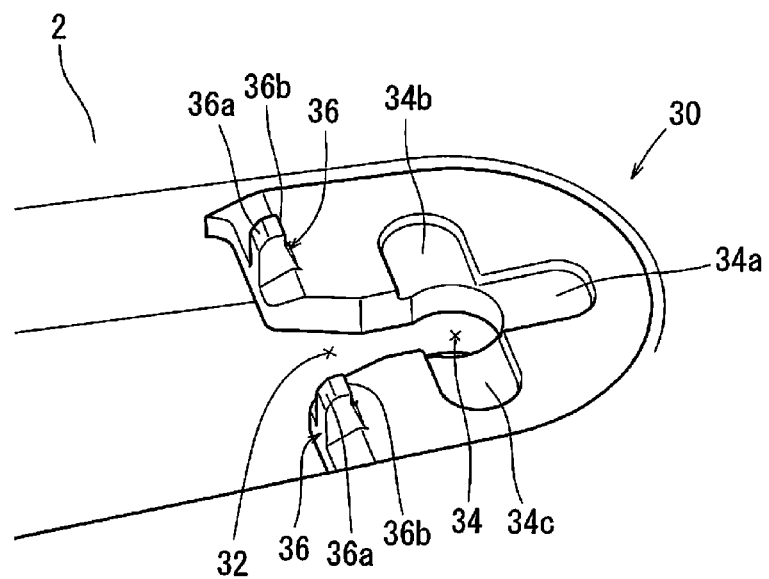
FIG. 4 is an enlarged view of a part of the cover.

A close-up view of the mounting area 30, to which the attachment section 20 of the clip 1 may attach, is shown in further detail in FIG. 4 The mounting area 30 has a guide groove 32 and a circular mounting hole 34. The mounting hole 34 may be formed toward the bottom of the guide groove 32. The mounting hole 34 is slightly larger than the pillar 22 of the clip 1. The mounting area 30 has a first recess 34a ahead of the guide groove 32 with the mounting hole 34. The mounting area 30 has a second recess 34b and a third recess 34c at positions generally perpendicular to the guide groove 32 and the first recess 34a.

The mounting area 30 has a pair of ribs 36 near the inlet of the guide groove 32. The distance between the pair of ribs 36 is slightly larger than the distance between the edges of the guide groove 32 and is also smaller than the longitudinal edge length of the base plate 12 of the clip 1. As a result, the attachment section 20 of the clip 1 can only be received by the mounting area 30 of the cover 2 in a predetermined direction (i.e., in the longitudinal direction of the base plate 12). When the attachment section 20 is attached to the mounting area 30, the clip 1 may be oriented to position the pair of elastic claws 14a to receive the opposing longitudinal edges of the clip hole 40 of the inner panel 3.

When an attempt is made to attach the attachment section 20 in a direction perpendicular to a linear attachment direction toward the mounting hole 34, the base plate 12 of the clip 1 may contact and/or interfere with the pair of ribs 36. As a result, the attachment section 20 may not be able to attach to the mounting area 30.

As shown in FIG. 10, each rib 36 has a gently sloped wall 36a on the side where the attachment section 20 of the clip 1 is received, and an erect wall 36b on the opposite side thereof. Thus, the detachment prevention member 12a of the base plate 12 may maneuver around and/or over the ribs 36 as needed to engage the attachment section 20 to the mounting area 30.

Returning now to FIG. 1, an elongated-hole-like clip hole 40 formed in the inner panel 3 is shown. The anchor portion 10 of the clip 1 attached to the cover 2 is inserted into the clip hole 40 to attach the cover 2 to the inner panel 3. The length of the short edges of the clip hole 40 is set such that the pair of elastic claws 14a of the anchor portion 10 are engaged with the longitudinal edges.

The length of the longitudinal edges of the clip hole 40 may be configured such that, when the clip 1 is rotated approximately 90 degrees from, for example, an initial engaged position, the pair of elastic claws 14a is released from the longitudinal edges. Thus, the clip 1 may be disengaged and/or removed from the inner panel 3 upon rotation of the clip 1 approximately 90 degrees.

Figure 5:
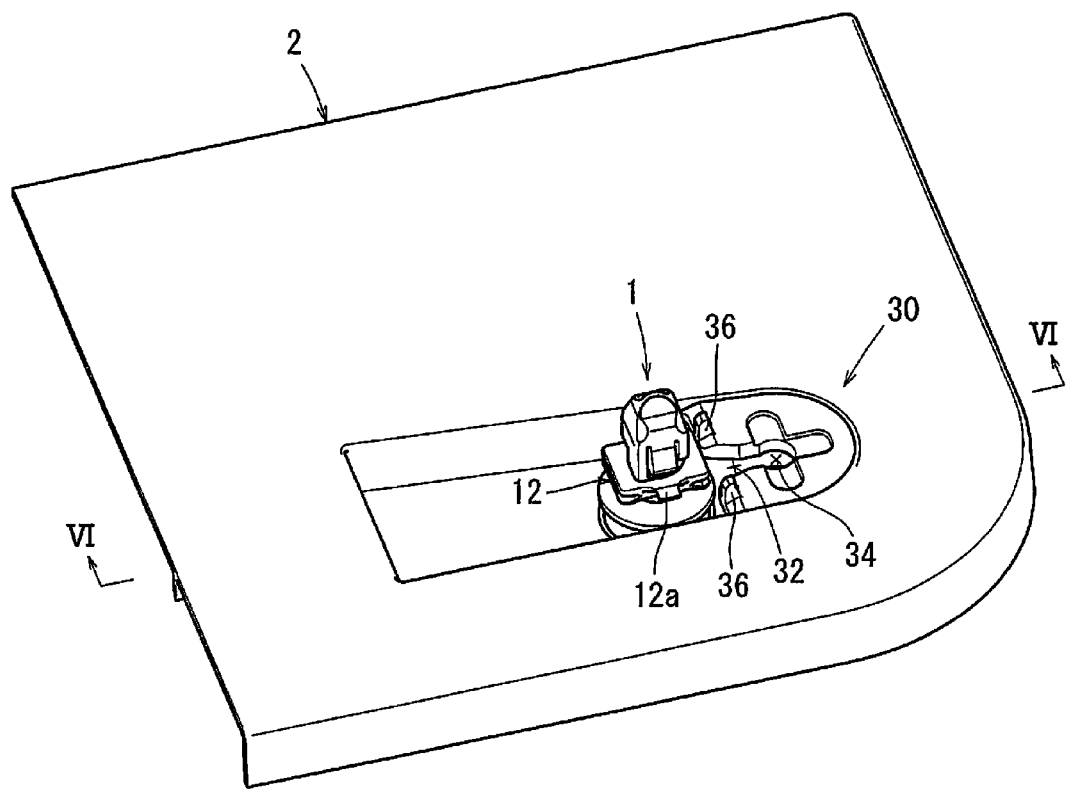
FIG. 5 is a perspective view of the clip and the cover for showing a procedure of mounting the clip to the cover.
Figure 6:
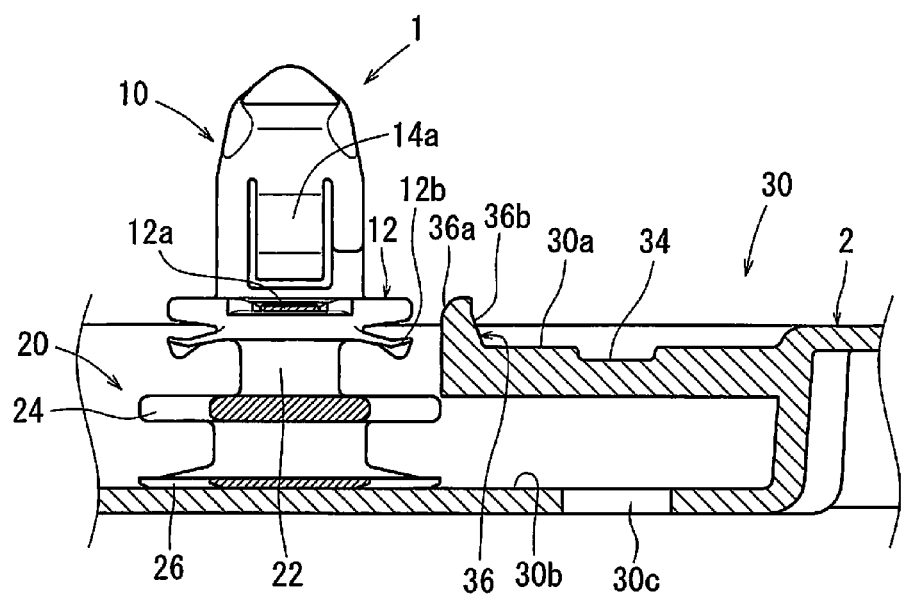
FIG. 6 is a cross-sectional view taken along line VI-VI in FIG. 5.

Procedures for mounting the cover 2 to the inner panel 3 by the clip 1 will be described in detail with reference to FIGS. 1 and 5 to 17. As shown in FIG. 1, a worker may insert the pillar 22 of the clip 1 into the guide groove 32 of the cover 2 as also shown in FIGS. 5 and 6. As a result, the flange 24 and the elastic members 12b of the clip 1 pinch the mounting area 30.

Figure 7:
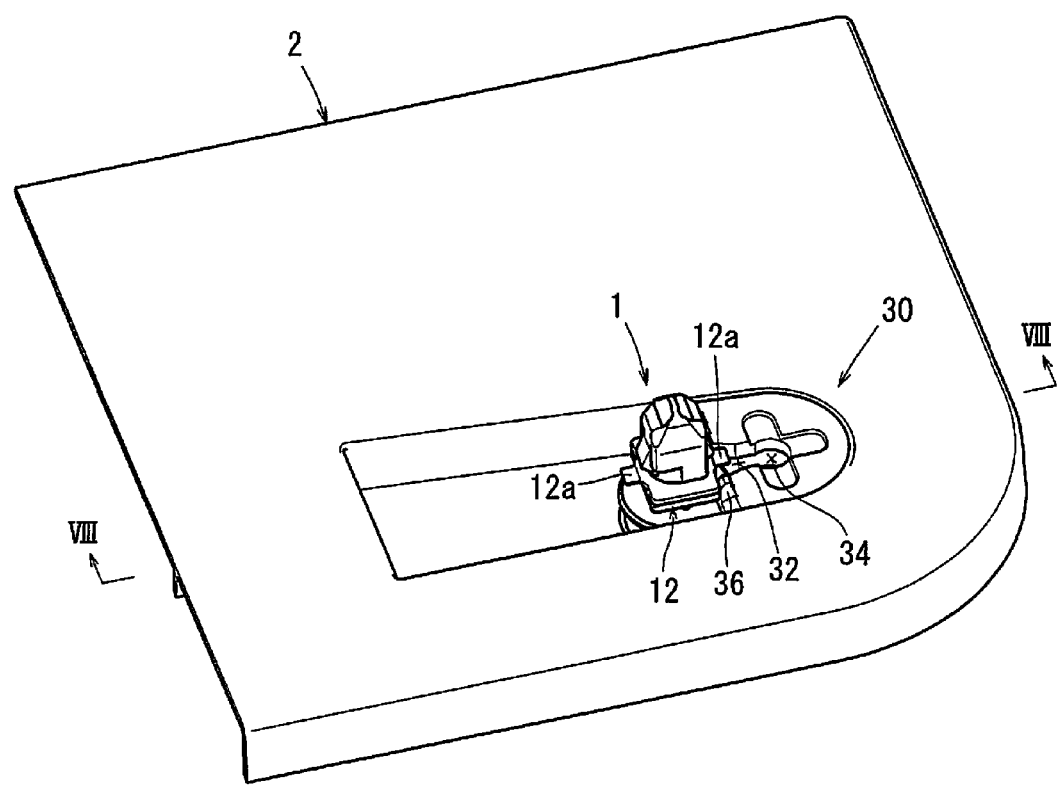
FIG. 7 is a perspective view of the clip and the cover for showing an example in which the clip is going to be mounted to the cover in an erroneous manner.
Figure 8:
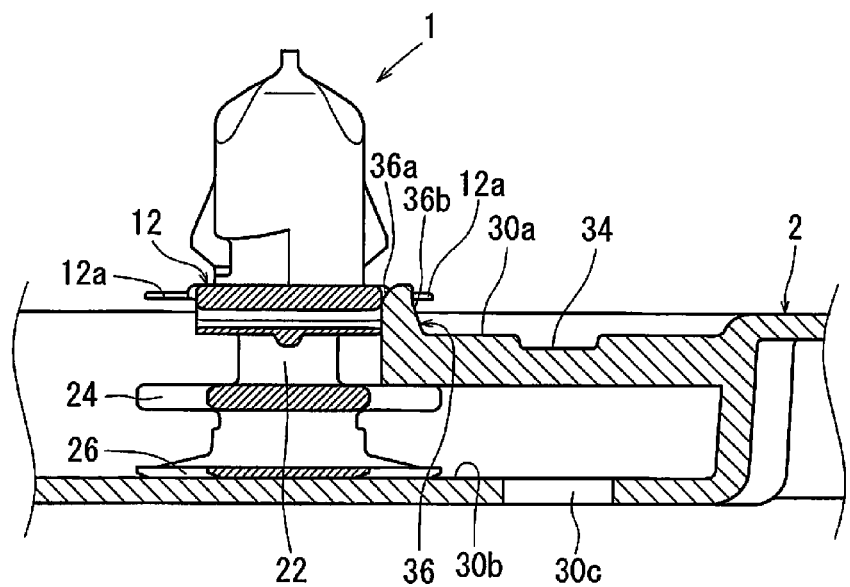
FIG. 8 is a cross-sectional view taken along line VIII-VIII in FIG. 7.

The pillar 22 shown in FIG. 6 is inserted into the guide groove 32 shown in FIG. 5 in the longitudinal direction of the base plate 12. When, as shown in FIGS. 7 and 8, the pillar 22 is inserted into the guide groove 32 in the shorter-side direction of the base plate 12, the base plate 12 may press against and thus interfere with the ribs 36 of the cover 2. Accordingly, the pillar 22 may not be inserted into the guide groove 32 along the shorter-side direction of the base plate 12. As a result, erroneous attachment of the clip 1 to the cover 2 may be avoided.

Figure 9:
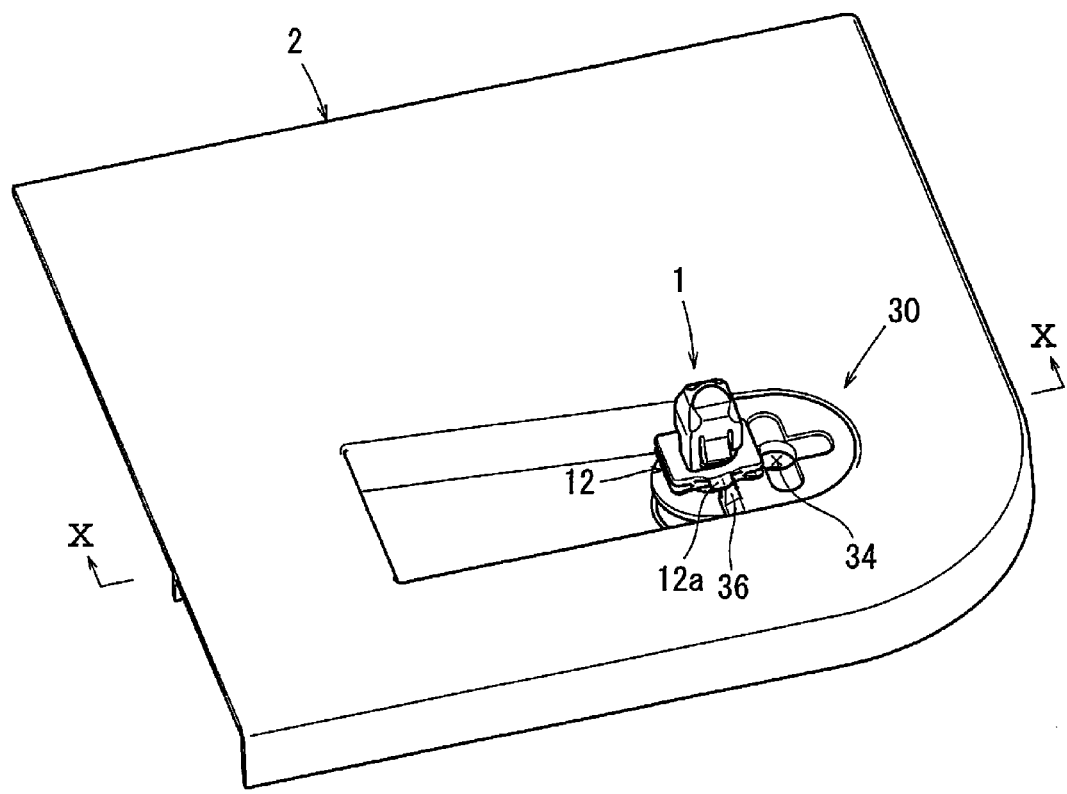
FIG. 9 is a perspective view of the clip and the cover for showing a procedure following the procedure of FIG. 5.
Figure 11:
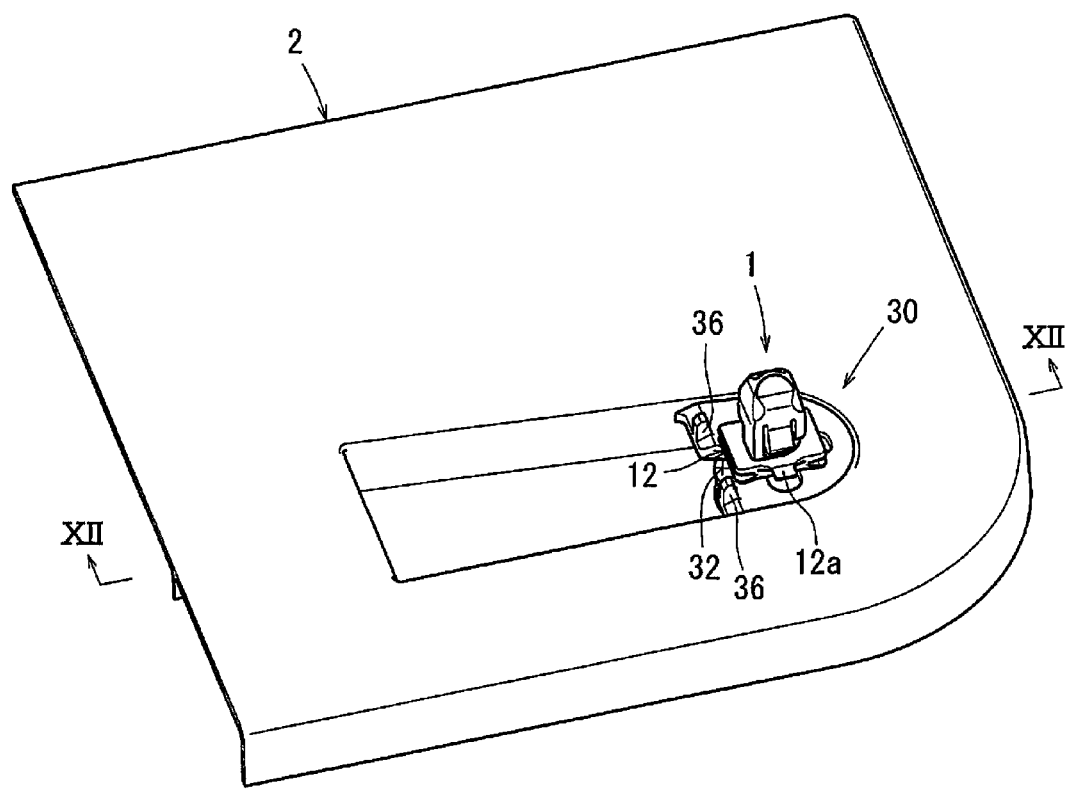
FIG. 11 is a perspective view of the clip and the cover for showing a procedure following the procedure of FIG. 9.

When the clip 1 is inserted into mounting hole 34 as shown in FIG. 5, the detachment prevention members 12a of the clip 1 may maneuver around the ribs 36 by guiding along the sloped walls 36a as shown in FIGS. 9 and 10. Upon further insertion of the clip 1 as described here, the pillar 22 of the clip 1 may reach the mounting hole 34 of the clip 1 as shown in FIGS. 11 and 12. As a result, the attachment section 20 of the clip 1 is attached to the mounting area 30 of the cover 2.

As shown in FIGS. 11 and 12, the elastic members 12b of the clip 1 may be guided and/or deflected by the surface 30a of the mounting area 30 of the cover 2. Thus, unwanted detachment of the attachment section 20 from the mounting area 30 may be suppressed. The stabilizer 26 of the clip 1 may compress against the bottom surface 30b of the cover 2. Thus, unwanted rattling of the attachment section 20 with respect to the mounting area 30 may be suppressed.

Figure 13:
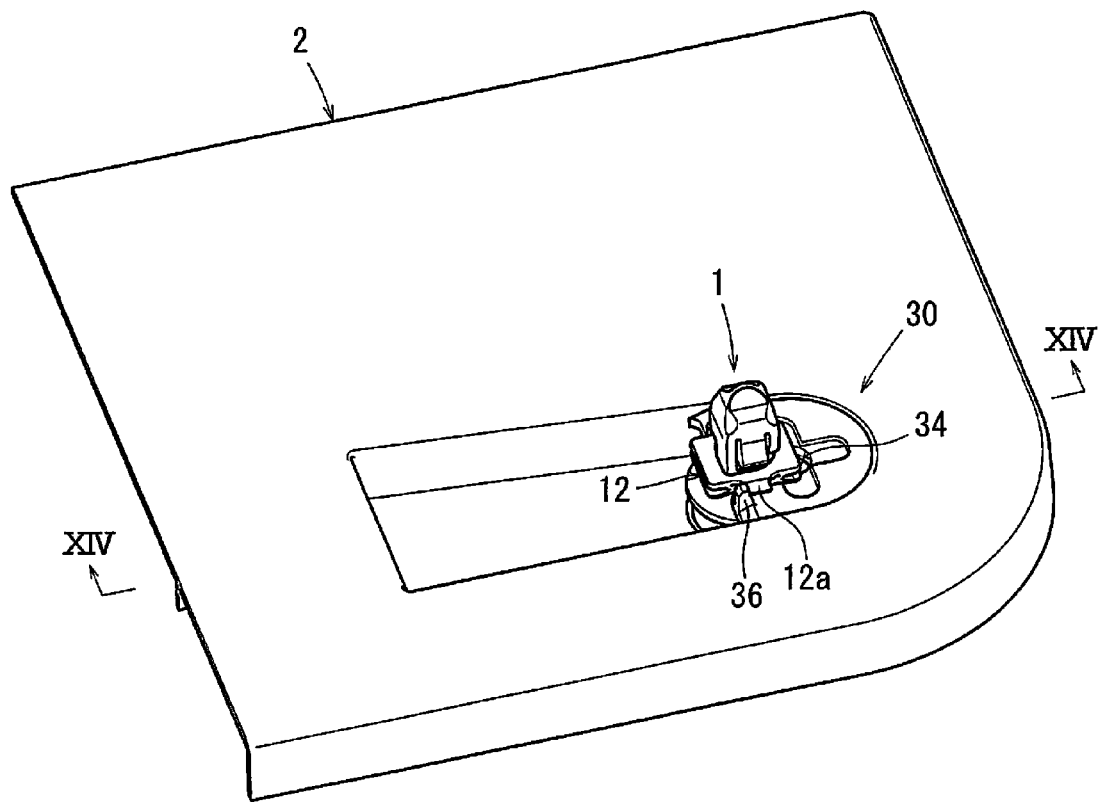
FIG. 13 is a perspective view of the clip and the cover for illustrating a function of preventing detachment by an attachment section of the clip.
Figure 14:
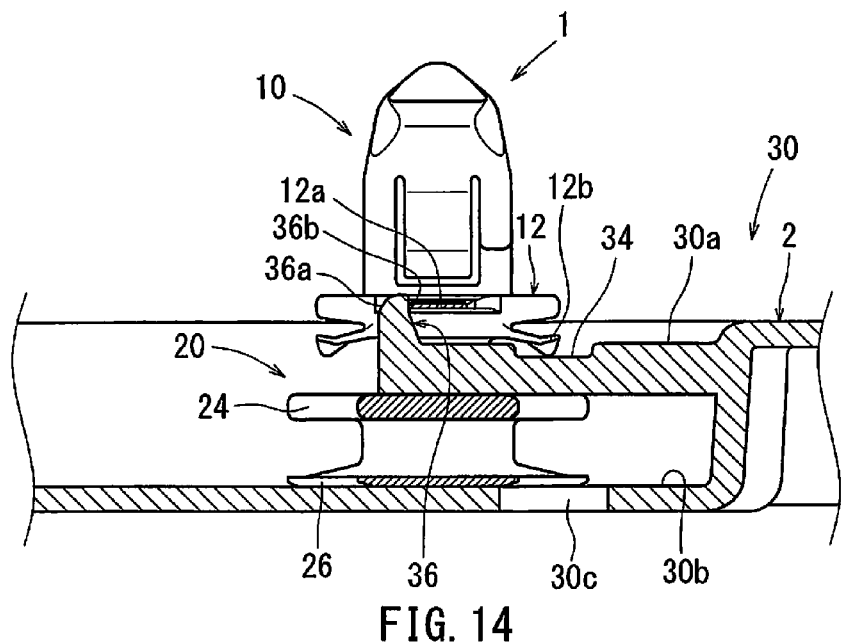
FIG. 14 is a cross-sectional view taken along line XIV-XIV in FIG. 13.

As shown in FIGS. 11 and 12, when the attachment section 20 is detached from the mounting area 30 by an external force, the detachment prevention members 12a of the clip 1 may press against and interfere with the erect walls 36b of the ribs 36 of the cover 2 as shown in FIGS. 13 and 14. Thus, unwanted detachment of the attachment section 20 from the mounting portion area 30 of the cover 2 may be prevented.

Figure 15:
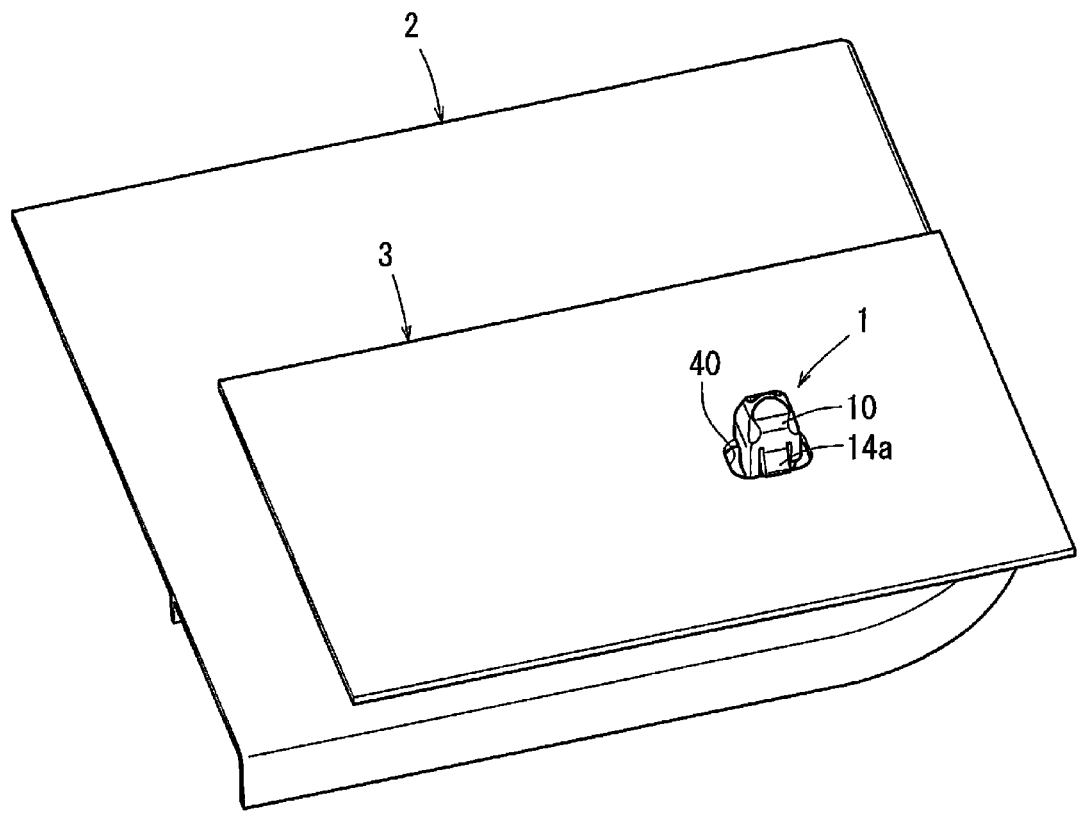
FIG. 15 is a perspective view of the inner panel and the cover and the clip in the mounted state.
Figure 16:
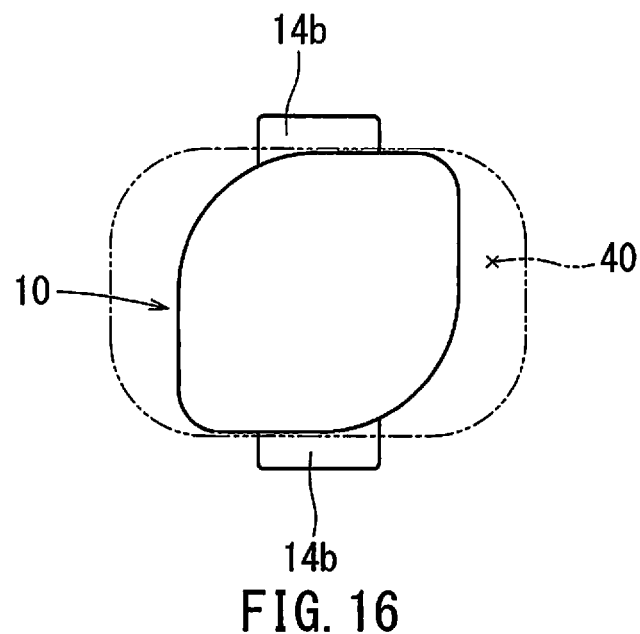
FIG. 16 is a schematic view for showing a relationship of the clip and a clip hole of the inner panel in FIG. 15.
Figure 17:
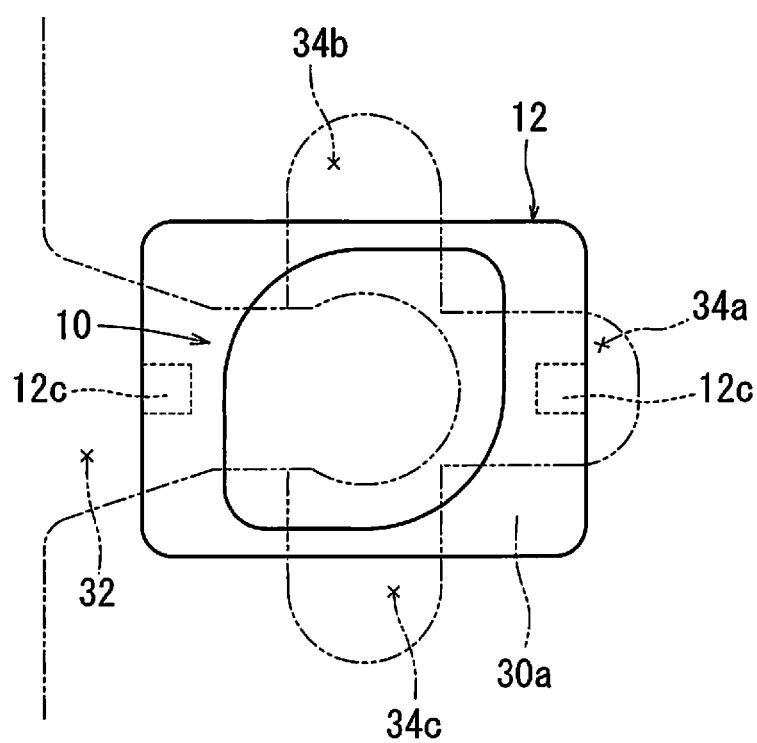
FIG. 17 is a schematic view for showing a relationship of the clip and the cover in FIG. 15.

As shown in FIGS. 14 and 15, the anchor portion 10 of the clip 1 inserts into the clip hole 40 of the inner panel 3 (also shown in FIGS. 16 and 17). The pair of elastic claws 14a engage with both of the longitudinal edges of the clip hole 40. As a result, the inner panel 3 may be attached to the cover 2 by the clip 1. In detail, the protrusions 12c of the clip 1 may enter the guide groove 32 and the first recess 34a.

Figure 18:
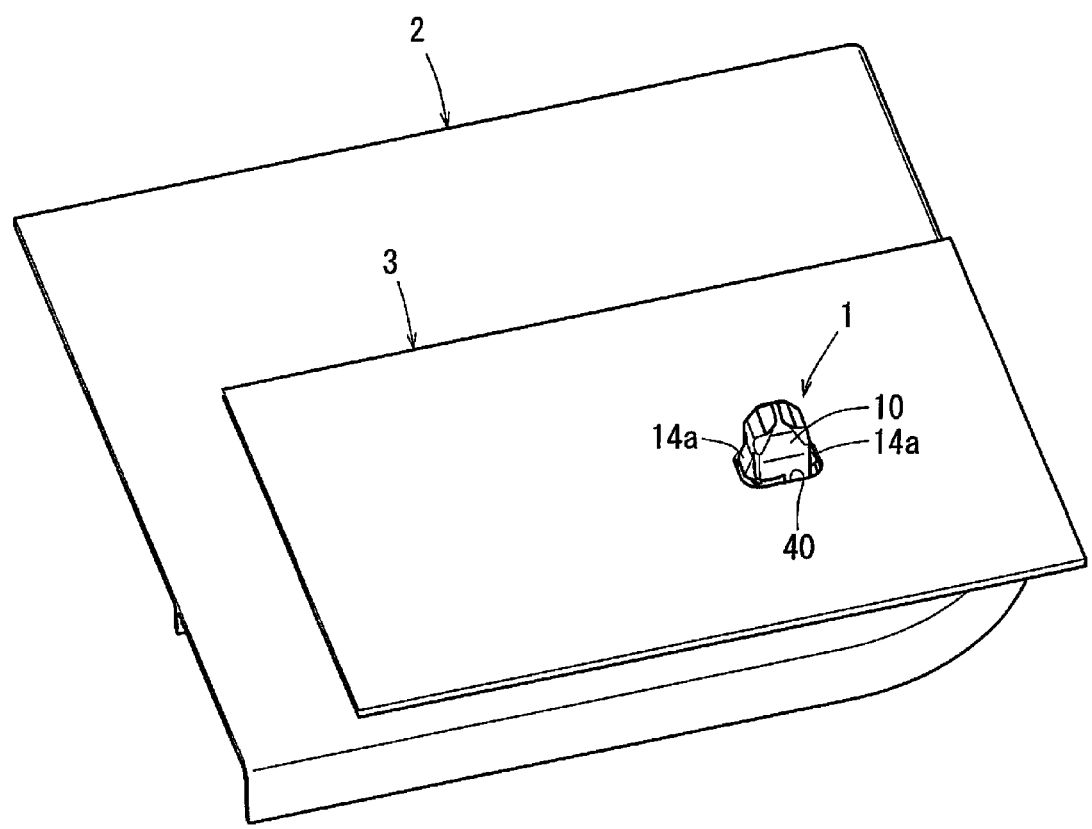
FIG. 18 is a perspective view of the inner panel and the cover and the clip for illustrating a procedure of detaching the cover from the inner panel.
Figure 19:
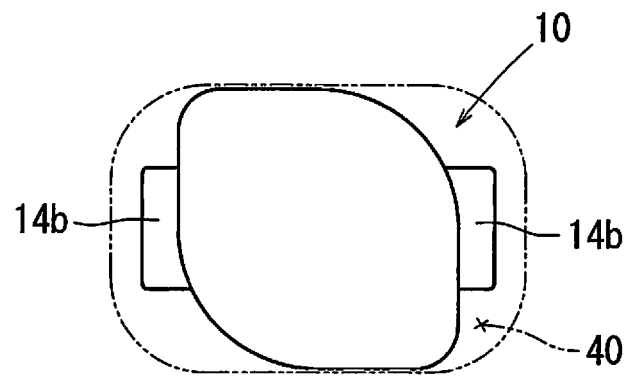
FIG. 19 is a schematic view for showing a relationship of the clip and the clip hole of the inner panel in FIG. 18.

Next, methods for removing the cover 2 from the inner panel 3 will be described in further detail. First, referring generally to FIGS. 3 and 12, a tool (not shown in the FIGS.) may be inserted into the tool insertion hole 26a of the clip 1 from the through-hole 30c of the cover 2. The clip 1 may be rotated approximately 90 degrees relative to the clip hole 40 by the tool. As a result, as shown in FIGS. 18 and 19, the pair of elastic claws 14a of the anchor portion 10 may release from the inner panel 3. Thus, the anchor portion 10 may be drawn out of the clip hole 40 to allow for the removal of the cover 2 from the inner panel 3.

Figure 20:
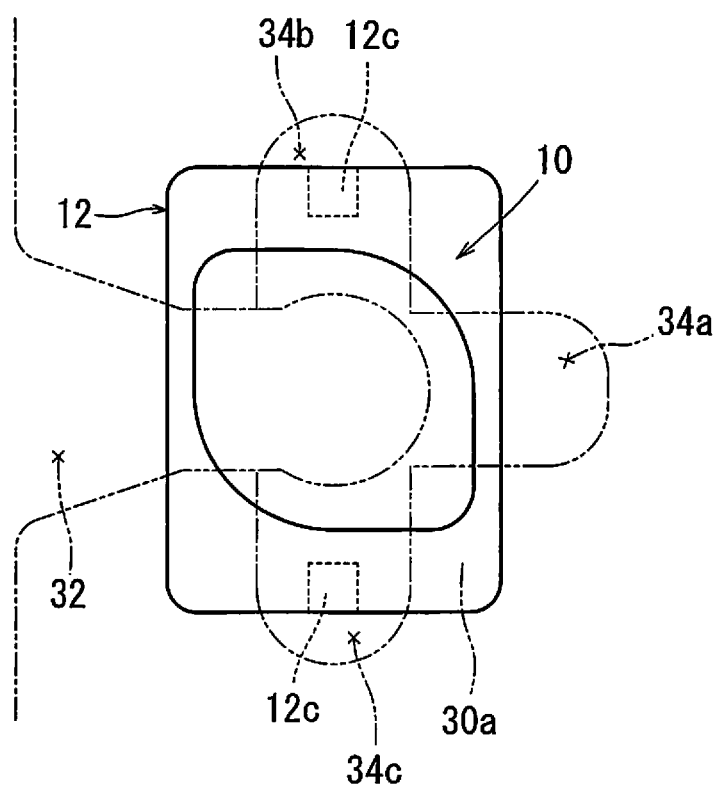
FIG. 20 is a schematic view for showing a relationship of the clip and a mounting hole of the cover.

As shown in FIG. 20, with the rotation of the clip 1, the protrusions 12c move from the guide groove 32 and the first recess 34a to the second recess 34b and the third recess 34c. Thus, after leaving the guide groove 32 and the first recess 34a, the protrusions 12c get over the surface 30a of the mounting area 30 to enter the second recess 34b and the third recess 34c.

In order for the clip 1 to freely rotate, the protrusions 12c must maneuver around and/or over the surface of the mounting area 30. Thus, idling, vibration and/or other unwanted movement of the clip 1 may be prevented. The protrusions 12c maneuver around and/or over the surface of the mounting area 30 to enter the second recess 34b and the third recess 34c, respectively. Further, as a result of that described above, the clip 1 may rotate crisply and/or responsively by approximately 90 degrees.

The clip hole 40 of the inner panel 3 may be configured as an elongated hole. Thus, the pair of elastic claws 14a may be released from engagement with the longitudinal edges upon rotation of the clip 1 by approximately 90 degrees with respect to the clip hole 40. Also, the force needed to remove the clip 1 from the inner panel 3 as disclosed in the prior art may be reduced. The mounting area 30 may include the pair of ribs 36 in a vicinity of the inlet of the guide groove 32. The distance between the pair of ribs 36 is slightly longer than the short edges of the base plate 12 of the clip 1. Accordingly, the base plate 12 of the clip 1 may contact, block and/or otherwise interfere with the ribs 36 of the cover 2 when an attempt is made to insert the pillar 22 of the clip 1 into the guide groove 32 over the cover 2 in a direction orthogonal to the guide groove 32. Thus, it is possible to prevent erroneous attachment of the clip 1 with respect to the cover 2.

The detachment prevention members 12a are formed at and extend from both longitudinal edges of the base plate 12. When the attachment section 20 receives an external force to detach from the mounting area 30, the detachment prevention members 12a may block and/or otherwise interfere with the erect walls 36b of the ribs 36 of the cover 2. Thus, the attachment section 20 may be prevented from detachment from the mounting area 30 of the cover 2.

Each elastic member 12b has a surface facing toward the base plate 12 and a surface opposite the same. The protrusion 12c is formed on the opposite surface. In detail, the protrusions 12c may enter the guide groove 32 and the first recess 34a when the cover 2 is attached to the inner panel 3 by the clip 1. Thus, idling and/or other unwanted movement of the clip 1 attached to the cover 2 may be prevented. Further, the clip 1 may be prevented from detachment from the cover 2 due to vibration during, for example, transportation.

The mounting area 30 has the second recess 34b and the third recess 34c positioned orthogonal to the direction of the guide groove 32 and the first recess 34a. In detail, the protrusions 12c of the clip 1 move from the guide groove 32 and the first recess 34a to the second recess 34b and the third recess 34c, respectively, upon rotation of the cover 2 from the inner panel 3. After leaving the guide groove 32 and the first recess 34a, the protrusions 12c may maneuver around and/or over a surface 3a (not shown in the FIGS.) of the mounting area 30 to enter into the second recess 34b and the third recess 34c. Further, and as discussed earlier, the protrusions 12c may enter the second recess 34b and the third recess 34c to provide an operator and/or a worker can be taught and/or crisp feel indicating rotation of the clip 1 by approximately 90 degrees relative to the clip hole 40.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. Embodiments of the present invention should not be limited to the representative configurations, but may be modified, for example, as described below.

For instance, the mounting member may be, as described in the embodiments above, the cover 2 that is an interior component of a vehicle door. Further, and as described earlier, the panel may be the inner panel 3 of a vehicle door. However, in alternative and/or additional embodiments, the cover may be one selected from various other types of mounting members and/or covers, and the panel may be one selected from various other types of panels.

As described above, the cover 2 may have one mounting area 30 for mounting the clip 1. In alternative and/or additional embodiments, the cover 2 may have a plurality of, e.g., two or more, mounting areas 30.

The invention claimed is:

1. A clip attachment structure comprising:
   a clip; and
   a mounting member attached to a panel by the clip,
   wherein the clip has:
      an anchor configured to attach the mounting member to the panel by insertion into a clip hole in the panel, and
      a pair of elastic claws extending from the anchor wherein the pair of elastic claws are configured to engage with the clip hole and further wherein the clip is configured to disengage from the clip hole upon rotation of the clip relative to the clip hole from an attached position where the pair of elastic claws are engaged with the edges of the clip hole, and
      a base plate formed at a vertical end of the anchor wherein the base plate is a singular rectangular shape with longitudinal edges and short edges, where the short edges are shorter than the longitudinal edges, and
      a pillar extending vertically from the base plate wherein the pillar is configured to be attached to the mounting member, and
   wherein the mounting member has a guide groove into which the pillar slides, whereby the mounting member is able to receive the pillar,
   wherein the mounting member includes a pair of ribs positioned at both the left and right sides, relative to a longitudinal length of an inlet space formed by the guide groove,
   wherein the shortest distance between each rib of the pair of ribs is smaller in magnitude than the length of each of the longitudinal edges of the base plate such that the pillar is prevented from entering into the guide groove in a direction that the longitudinal edges of the base plate are parallel to the line coinciding with the shortest distance between the ribs,
   while the shortest distance between each rib of the pair of ribs is larger than the short edges of the base plate such that the base plate is allowed to pass through the space between the pair of ribs thereby the pillar is allowed to enter into the guide groove in a direction that the short edges of the base plate are parallel to the line coinciding with the shortest distance between the ribs,
   wherein the guide groove has a length such that the entire length of each of the longitudinal edges of the base plate passes through the space between the pair of ribs, in a direction that the short edges of the base plate are parallel to the line coinciding with the shortest distance between the ribs, wherein through said movement the clip is attached to the mounting member, and the pillar enters into the guide groove.

2. The clip attachment structure of claim 1, wherein the anchor has a detachment prevention member configured to interfere with the ribs to prevent detachment of the clip from the mounting member.

3. The clip attachment structure of claim 1, wherein the anchor has a protrusion configured to enter a first recess of the mounting member to prevent idling of the clip relative to the mounting member.

4. The clip attachment structure of claim 3, wherein the mounting member has a second recess, and wherein the protrusion of the anchor is configured to detach from the first recess to maneuver around a surface of the mounting member to enter the second recess when the clip is rotated approximately 90 degrees with respect to the clip hole.

5. A clip attachment structure comprising:
   a clip; and
   a mounting member mounted to a panel by the clip,
   wherein the clip has:
      an anchor configured to rotatably attach to the mounting member wherein the anchor is configured to insert into a clip hole having with an elongated shape formed in the panel,
      a pair of elastic claws formed on the anchor wherein the pair of elastic claws are configured to engage with opposing longitudinal edges of the clip hole, and
      an attachment section attached to the mounting member wherein the pair of elastic claws are configured to disengage with the longitudinal edges of the clip hole upon rotation of the clip approximately 90 degrees in a first direction relative to the clip hole from an attached state where the pair of elastic claws are engaged with the longitudinal edges of the clip hole, and further wherein the pair of elastic claws are disengage from the longitudinal edges upon rotation opposite to the first direction relative to the clip hole,
   wherein the anchor has a base plate positioned in between the panel and the mounting member and further wherein the base plate is a singular rectangular shape with longitudinal edges and short edges that are shorter than the longitudinal edges,
   wherein the mounting member has a pair of ribs to guide the clip relative to the mounting member to orient the pair of elastic claws of the clip to engage with the longitudinal edges of the clip hole,
   wherein the mounting member has a guide groove configured to receive a pillar of the attachment section; and
   further wherein the pair of ribs are positioned at both the left and right sides, relative to a longitudinal length of an inlet space formed by the guide groove, to extend toward the panel,
   wherein the shortest distance between each rib of the pair of ribs is smaller in magnitude than the length of each of the longitudinal edges of the base plate such that the pillar is prevented from entering into the guide groove in a direction that the longitudinal edges of the base plate are parallel to the line coinciding with the shortest distance between the ribs,
   while the shortest distance between each rib of the pair of ribs is larger than the short edges of the base plate such that the base plate is allowed to pass through the space between the pair of ribs thereby the pillar is allowed to enter into the guide groove in a direction that the short edges of the base plate are parallel to the line coinciding with the shortest distance between the ribs, wherein the guide groove has a length such that the entire length of each of the longitudinal edges of the base plate passes through the space between the pair of ribs, in a direction that the short edges of the base plate are parallel to the line coinciding with the shortest distance between the ribs, wherein through said movement the clip is attached to the mounting member, and the pillar enters into the guide groove.

6. The clip attachment structure of claim 5, wherein the clip has detachment prevention members that extend from each of the short edges of the base plate, wherein the detachment prevention members are configured to elastically deform upon being pushed toward each rib of the pair of ribs to allow the pillar to insert into the guide groove, and further wherein the detachment prevention members are configured to interfere with the pair of ribs to prevent detachment of the pillar from the guide groove when the pillar is moved out of the guide groove.

7. The clip attachment structure of claim 6, wherein each rib of the pair of ribs has:
  a sloped wall configured to guide the detachment prevention member to deform upon insertion of the pillar into the guide groove.

8. The clip attachment structure of claim 6, wherein each rib of the pair of ribs has:
  an erect wall configured to prevent movement of the detachment prevention member when the pillar moves out from the guide groove.

* * * * *